United States Patent
Yi

(10) Patent No.: US 8,228,435 B2
(45) Date of Patent: *Jul. 24, 2012

(54) ENHANCED METADATA PRESENTED IN A POP-UP WINDOW ON CROSS-MEDIA BAR USER INTERFACE WHEN A USER HOVERS A SCREEN CURSOR OVER A TV CHANNEL ICON

(75) Inventor: Hyehoon Yi, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 514 days.

This patent is subject to a terminal disclaimer.

(21) Appl. No.: 12/469,485

(22) Filed: May 20, 2009

(65) Prior Publication Data

US 2010/0157157 A1 Jun. 24, 2010

Related U.S. Application Data

(60) Provisional application No. 61/138,913, filed on Dec. 18, 2008.

(51) Int. Cl.
| | |
|---|---|
| *H04N 5/50* | (2006.01) |
| *G06F 3/00* | (2006.01) |
| *G06F 13/00* | (2006.01) |
| *G06F 3/048* | (2006.01) |
| *H04N 5/445* | (2011.01) |

(52) U.S. Cl. ............ 348/570; 725/38; 725/40; 725/43; 725/44; 725/52; 725/56; 725/57; 725/58; 725/61; 715/711; 715/716; 715/802; 715/808; 715/814

(58) Field of Classification Search ........................ None
See application file for complete search history.

(56) References Cited

U.S. PATENT DOCUMENTS

| | | | |
|---|---|---|---|
| 6,151,059 A | 11/2000 | Schein | |
| 6,323,911 B1 | 11/2001 | Schein | |
| 7,827,207 B2* | 11/2010 | Takatsuka et al. | ............ 707/802 |
| 2002/0116709 A1 | 8/2002 | Sakamoto | |
| 2003/0016254 A1* | 1/2003 | Abe | ............................. 345/864 |
| 2005/0204384 A1* | 9/2005 | Yuen et al. | ....................... 725/43 |
| 2005/0235209 A1* | 10/2005 | Morita et al. | ................. 715/716 |
| 2006/0015903 A1 | 1/2006 | MacBeth | |
| 2006/0020969 A1 | 1/2006 | Utsuki et al. | |
| 2007/0083892 A1 | 4/2007 | Yun | |
| 2007/0089133 A1 | 4/2007 | Hou | |
| 2007/0150828 A1* | 6/2007 | Tsukada et al. | ................ 715/777 |
| 2007/0229465 A1* | 10/2007 | Sakai et al. | .................... 345/173 |
| 2008/0059571 A1* | 3/2008 | Khoo | ............................ 709/203 |
| 2008/0062127 A1* | 3/2008 | Brodersen et al. | ............. 345/158 |
| 2008/0313674 A1 | 12/2008 | Dunton | |
| 2008/0313675 A1* | 12/2008 | Dunton | ............................ 725/46 |
| 2009/0228804 A1* | 9/2009 | Kim et al. | ...................... 715/745 |
| 2011/0252314 A1* | 10/2011 | Barker et al. | ................. 715/255 |

\* cited by examiner

*Primary Examiner* — Hoang-Vu A Nguyen-Ba
(74) *Attorney, Agent, or Firm* — John L. Rogitz

(57) ABSTRACT

When a user hovers a screen cursor over a TV channel icon on a cross-media bar (XMB) user interface (UI) for a threshold period, enhanced metadata from PSIP/XDS/EPG that pertains to the program currently available on the associated TV channel is presented in a pop-up window on the XMB UI.

13 Claims, 2 Drawing Sheets

| Channel | 8 - 9 (current) | 9 - 10 (future) ... |
|---|---|---|
| 2 | Program A | Program A1 ... |
| 3 | Program B | Program B1 ... |
| ⋮ | ⋮ | ⋮ |

FIG. 2 EPG

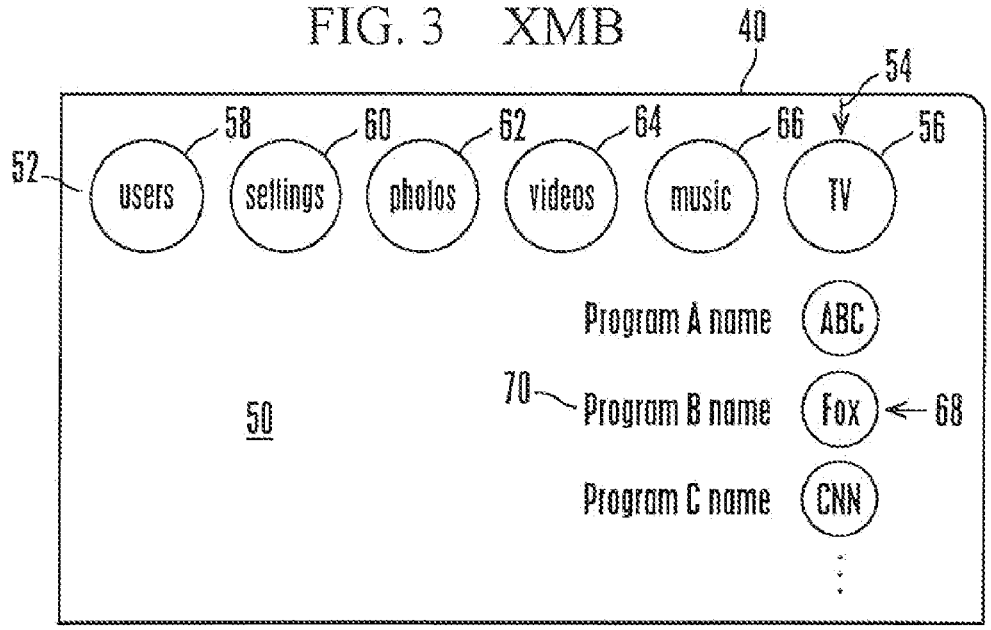
FIG. 3 XMB
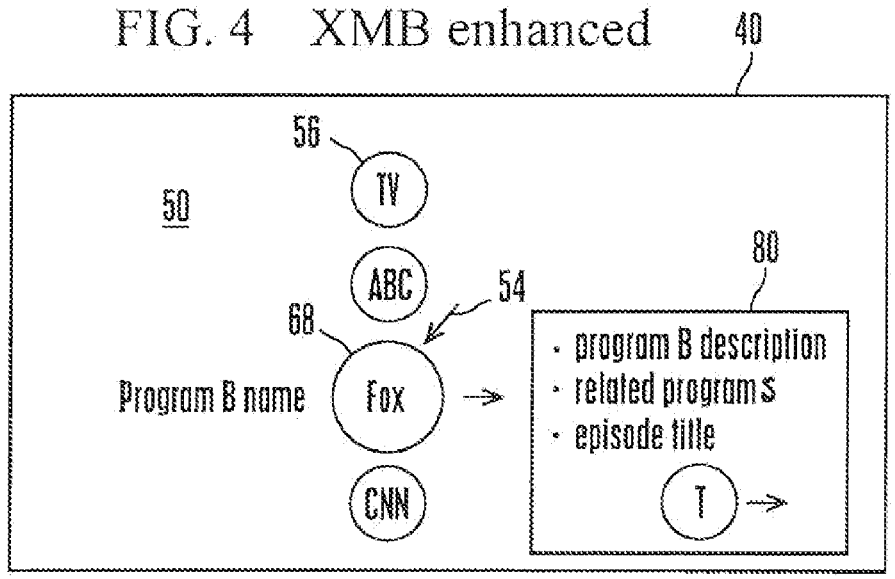
FIG. 4 XMB enhanced
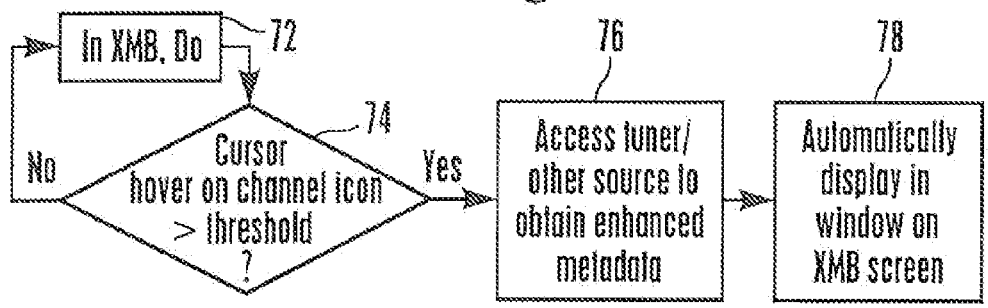
FIG. 5 logic

ENHANCED METADATA PRESENTED IN A POP-UP WINDOW ON CROSS-MEDIA BAR USER INTERFACE WHEN A USER HOVERS A SCREEN CURSOR OVER A TV CHANNEL ICON

Priority is claimed from U.S. provisional patent application 61/138,913, filed Dec. 18, 2008.

I. FIELD OF THE INVENTION

This application relates generally to presenting enhanced metadata information on TV programs listed on a user interface such as a cross-media bar (XMB).

II. BACKGROUND OF THE INVENTION

TV user interfaces (UI) have been provided that list, on the TV display, TV channels available for viewing. As recognized herein the UI typically present only a limited amount of program information for a channel. If further information is required the user typically must tune to the channel itself or access an additional application that may be provided by a third party, i.e., by an entity other than the TV manufacturer. Such an application consequently may not be efficiently integrated with the UI, which typically is provided by the TV manufacturer.

SUMMARY OF THE INVENTION

A system includes a video display, a processor controlling the video display, and a TV tuner providing TV signals to the processor for presentation on the display. The processor presents a user interface (UI) on the TV display. The UI lists icons representing respective media sources in a horizontal row. One of the media sources is the TV tuner represented by a TV icon. When the TV icon is active a list of TV channel icons is presented in a vertical column under the TV icon. In turn, when a TV channel icon is active for a first period, first metadata associated with a respective TV channel is presented on the display, and when the TV channel icon is active for greater than the first period, second metadata associated with the respective TV channel is presented on the display without requiring the user to tune to the TV channel or invoke a program guide application. The TV channel icon lists metadata associated with only a currently available program such that no metadata associated with past or future TV programs can be displayed on the UI.

In example embodiments the first metadata may include channel logo, channel name and current program title information, while the second metadata may include program thumbnail, program description and episode title. The second metadata may also include information pertaining to a program different than a current program on the TV channel as well as a video preview of the TV channel. The second metadata can be presented in a window on the display covering only a fractional portion of the display, e.g., a bottom right corner region of the display. As discussed further below, the second metadata can be automatically presented on the display in response to user-controlled activation of an associated TV channel icon without removing the UI from the display and without requiring a user to tune to a channel or access the EPG.

In another aspect, a method includes presenting a cross-media bar (XMB) on a TV display. The XMB shows representations of at least two sources of information, with one of the sources being a TV tuner and another source not being a TV tuner. In response to activation of a representation of the TV tuner, representations of TV channels available from the TV tuner are presented on the XMB. Also, in response to activation of a representation of a TV channel, first metadata pertaining to a program currently carried on the channel is presented at a first time and then second metadata pertaining to the program currently carried on the channel is presented at a second time.

In another aspect, an audio-video display assembly includes a video display, a processor controlling the display, and a computer readable storage medium accessible to the processor and bearing instructions to cause the processor to present, on the display, a user interface (UI) including icons representing respective TV channels available for presentation on the display. The processor presents, next to each icon, a name of a program currently available on the associated channel, and in response to a user-control led selection of an icon, in a window distanced on the display from the icon, enhanced information pertaining to the program is presented. No information pertaining to any program not currently available on one of the TV channels is presented on the UI, although such information may be presented on an EPG.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a screen shot of an electronic program guide (EPG) that can be displayed by the TV system;

FIG. 3 is a screen shot of a cross-media bar (XMB) that can be presented on the TV display;

FIG. 4 is a screen shot of a cross-media bar (XMB) that can be presented on the TV display when a screen cursor has hovered over a TV channel longer than a threshold period, showing only the TV genre column of the XMB for clarity; and FIG. 5 is example logic that may be executed in accordance with present principles.

DETAILED DESCRIPTION OF THE PREFERRED EMBODIMENT

Figure 1:
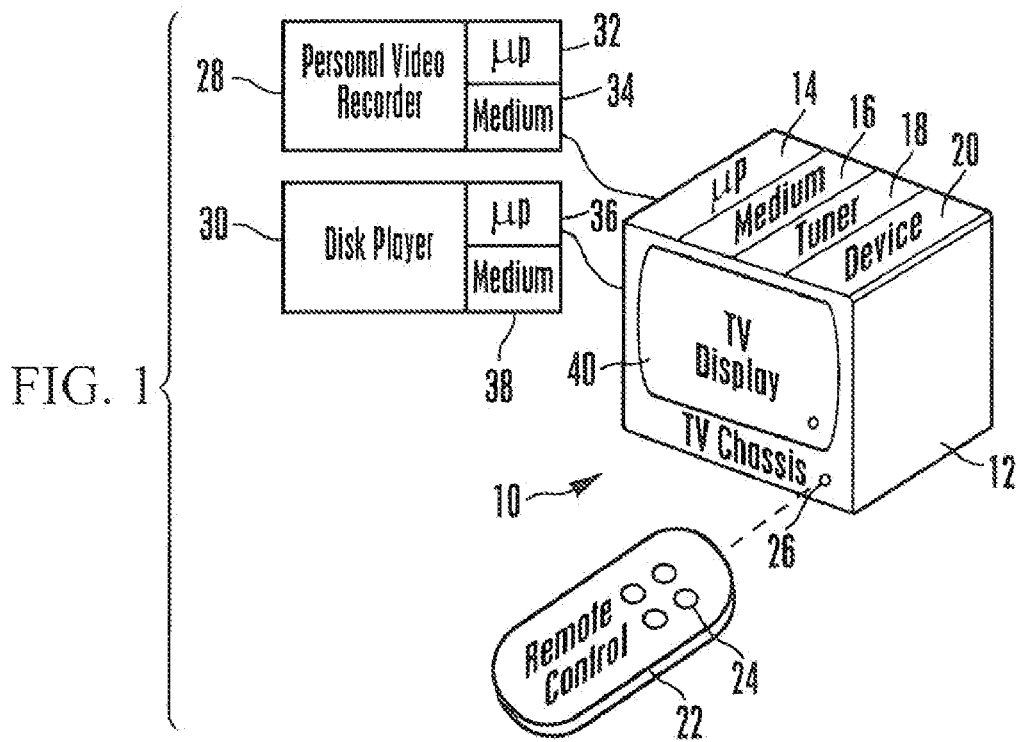
FIG. 1 is a block diagram of an example TV system in accordance with present principles.

Referring initially to FIG. 1, a TV system 10 includes a TV chassis 12 holding a TV processor 14 accessing a computer-readable storage medium 16 such as disk-based or solid state storage. The chassis 12 may also hold a TV tuner 18 communicating TV signals to the TV processor 14. There need be only a single analog/digital TV tuner 18 provided in the TV system 10, it being understood that the single analog/digital TV tuner 18 may be physically implemented by one and only one combined digital/analog tuner or by a single digital tuner or by one and only one digital tuner in combination with one and only one analog tuner. In other embodiments only a single analog tuner and no digital tuners may be provided. The tuner 18 may be provided in the chassis 12 or in a set-top box, and the tuner 18 may receive TV signals from a satellite, cable head end, terrestrial broadcast antenna, etc. If desired, a network interface 20 such as but not limited to an Internet enabled modem may be provided to send Internet signals to the TV processor 14.

As shown, the TV system 10 also includes a portable hand-holdable TV remote control (RC) 22. The RC 22, among other things, can have cursor control keys 24 for sending wireless signals to a receiver 26 on the chassis 12. The signals detected by the receiver 26 are sent to the TV processor 14 for controlling a screen cursor in accordance with description below.

In some embodiments the TV system 10 may receive video from a personal video recorder (PVR or DVR) 28 and/or from a digital disk player 30. The PVR 28 typically includes a PVR processor 32 accessing a PVR storage medium 34 storing audio and/or video data and likewise the disk player 30 typically includes a disk processor 36 accessing a disk storage medium 38 storing audio and/or video data. Content from the TV tuner 18 and, when provided, from the PVR 28/disk player 30 may be presented under control of the TV processor 14 on a TV display 40 such as but not limited to a plasma display or flat panel matrix-type display, either standard definition (SD) and/or high definition (HD). Additional content sources such as but not limited universal serial bus (USB) mass storage and removable memory media may be used in conjunction with the TV system 10.

FIG. 2 is used only to illustrate that the display 40 under control of the TV processor 14 may present an electronic program guide (EPG) user interface (UI) which lists available channels, typically by channel number, in a first column 42 and, for each channel, both currently available programs by program name and future programs by program name in associated current and future time slot columns 44, 46. A user may navigate the EPG using the RC 22 to select a desired channel for tuning and subsequent presentation of the associated program on the display 40. The EPG may be entered by pressing a "program guide" button on the RC 22, from an initial settings menu, or by other means known in the art.

In contrast, FIGS. 3 and 4 show a cross-media bar (XMB) UI 50 which shows various input genres, of which the TV tuner is but one, with the XMB having the capability of listing only currently available TV programs and in the example shown with no capability to list or indicate future TV programs. With greater specificity, the XMB 50, which may be entered by pressing a "XMB" key on the RC 22 or from a setup menu or other menu on the TV, typically includes a row 52 of feature icons. The icons are used to represent categories to organize the content options available to the user. An icon in the row 52 may be activated by moving a screen cursor 54 (FIG. 3) over the icon, in some cases accompanied by manipulating a "select" key on the RC 22. When an icon such as a TV icon 56 is made active, several more icons appear vertically beneath (and in some cases above) the selected icon 56 in a vertical column as shown, with the icons in the column representing instances of the selected genre, in this case, TV channels.

By way of non-limiting example, the XMB 50 shown in FIG. 3 may include a "users" icon 58, selection of which causes a column of user profiles to be presented above and/or below the users icon 58. The XMB 50 may also include a settings icon 60, selection of which may causes a column of setting options such as language selection, etc. to be presented above and/or below the icon 60. Likewise, a "photos" icon 62 may be presented in the row 52, selection of which causes icons representing photos available on, e.g., any one or more of the storage media 16, 34, 38 to appear in a column on the icon 62.

Similarly, a "videos" icon 64 may be presented in the row 52, selection of which causes icons representing videos available on, e.g., any one or more of the storage media 16, 34, 38 to appear in a column on the icon 64. Also, a "music" icon 66 may be presented in the row 52, selection of which causes icons representing audio files available on, e.g., any one or more of the storage media 16, 34, 38 to appear in a column on the icon 66. In all of the above cases, a user can select an icon in a column to cause the associated audio track/video/photo/etc. to be presented on the TV system 10. If desired, the default background color of the XMB 50 may change depending on the current month of the year, and it may change brightness depending on the time of day.

As shown in FIG. 3, when the TV genre icon 56 is initially selected, TV channel icons 68 are presented in a column on the TV genre icon 56. Each TV channel icon 68 typically presents the channel name, if desired in logo format or with a channel logo, along with the name 70 of the TV program that is currently available on the channel. Future TV programs on that channel typically cannot be displayed by the XMB 50.

As understood herein, the user may desire additional information about a TV program listed on the XMB 50 and may find it inconvenient to switch over to the EPG shown in FIG. 2 or to tune to the channel to obtain additional information, in both cases being forced to leave the XMB 50 and access the TV tuner or third party EPG application.

Accordingly, in cross-reference to FIGS. 4 and 5, block 72 in FIG. 5 simply indicates that when the XMB 50 is invoked on the display 40 and a channel icon 68 ("Fox", in the example shown) is selected by clicking a "select" key on the RC 22 or more preferably by hovering the cursor 54 over the desired channel icon for longer than a threshold period, e.g., three seconds at decision diamond 74, enhanced metadata associated with the selected channel is accessed at block 76. This enhanced metadata may include accessing the tuner 18, accessing the EPG 40 data structure, etc. to obtain the metadata. For example, the tuner 18 can be accessed to obtain Program and System Information Protocol (PSIP) information carried in the selected channel when the selected channel is a digital channel. The PSIP information can include the major and minor channel numbers, the parental rating of the current program on the selected channel, and the program name/episode title of the current program. Other information, such as directed channel change to a related advertising channel with related programs thereon, may be carried as part of PSIP. Also, information representing the resolution and format (e.g., 16×9) associated with the current program on the current channel may be obtained. Furthermore, a thumbnail such as a still or moving image miniature of the current program may be obtained.

Additionally, in the event that the selected channel is an analog channel Extended Data Services (XDS) information, typically conveyed in the vertical blanking interval (VBI) of the channel, can be accessed to obtain, e.g., time of day, station call letter, and the name of the current program/current program episode title on the selected channel.

Moreover, the EPG 40 data stricture may be accessed to obtain a description of the program currently being conveyed on the selected channel. In this case, the EPG data structure is accessed using the current time and selected channel as entering arguments. Additionally, the network interface 20 may be accessed to download current program information from the Internet. Other sources of enhanced metadata may include an out of band (OOB) receiver and a satellite receiver.

It is to be understood that the information gathered at state 76 may occur periodically or continuously and stored in short term memory for immediate access when the threshold period elapses, or it may be gathered when the threshold period elapses. In any case, once the enhanced metadata is obtained it is presented on the display 40 at block 78. In the embodiment shown in FIG. 4, the enhanced metadata is presented in a pop-up window 80 on the XMB UI 50 in, e.g., a lower right hand portion of the display 40, which pops up only after the threshold time period of cursor hovering. As an example, the window 80 presents the description of the program currently being sent on the selected channel 68, a list of related programs/channels, an episode title of the current program, and a thumbnail "T" pertaining to the current program. The window 80 may disappear when, e.g., the cursor is removed from the icon or the XMB is terminated.

It may now be appreciated that the window 80 conveniently shows the additional metadata information pertaining to the selected channel oil the XMB 50 without forcing a user to tune to the channel or enter the EPG 40 application to obtain the metadata.

While the particular ENHANCED PROGRAM METADATA ON CROSS-MEDIA BAR is herein shown and described in detail, it is to be understood that the subject matter which is encompassed by the present invention is limited only by the claims.

What is claimed is:

1. System comprising:
video display;
processor controlling video display;
TV tuner providing TV signals to the processor for presentation on the display;
the processor presenting a user interface (UI) on the TV display, the UI listing icons representing respective media sources in a horizontal row, at least one media source being the TV tuner represented by a TV icon an at least one media source being a non-TV source, wherein when the TV icon is active a list of TV channel icons is presented in a vertical column under the TV icon, wherein responsive to a TV channel icon being active first metadata associated with a respective TV channel is presented on the display, wherein responsive to the TV channel icon being active for greater than a first period second metadata associated with the respective TV channel is presented on the display without requiring the user to tune to the TV channel or invoke a program guide application, the second metadata being acquired from a program guide application.

2. The system of claim 1, wherein the first metadata includes channel logo, channel name and current program title information.

3. The system of claim 1, wherein the first metadata includes one or more of channel logo, channel name, current program title information.

4. The system of claim 1, wherein the second metadata includes program thumbnail, program description and episode title.

5. The system of claim 1, wherein the second metadata includes one or more of program thumbnail, program description, episode title.

6. The system of claim 1, wherein the second metadata includes information pertaining to a program different than a current program on the TV channel.

7. The system of claim 1, wherein the second metadata includes a video preview of the TV channel.

8. The system of claim 1, wherein the second metadata is presented in a window on the display covering only a fractional portion of the display.

9. The system of claim 8, wherein the window is presented in a bottom right corner region of the display.

10. The system of claim 1, wherein the second metadata is automatically presented on the display in response to user-controlled activation of an associated TV channel icon without removing the UI from the display and without requiring a user to tune to a channel or access the EPG.

11. Method comprising:
presenting a cross-media bar (XMB) on a TV display, the XMB showing representations of at least two sources of information, one of the sources being a TV tuner and another source not being a TV tuner;
in response to activation of a representation of the TV tuner, presenting representations of TV channels available from the TV tuner; and
presenting first metadata pertaining to a program currently carried on the channel at a first time and then presenting second metadata pertaining to the program currently carried on the channel at a second time, wherein the representations are icons and the second time is established when a screen cursor has hovered on a TV channel icon for at least a threshold period.

12. The method of claim 11, wherein the first metadata is presented alongside the representation of the TV channel at a first time and the second metadata is presented in a window spaced from the representation of the TV channel at a second time.

13. The method of claim 12, wherein the window is presented simultaneously with the representations of the TV channels available from the TV tuner.

* * * * *